United States Patent [19]

Rawlings et al.

[11] Patent Number: 4,574,875
[45] Date of Patent: Mar. 11, 1986

[54] HEAT EXCHANGER FOR GEOTHERMAL HEATING AND COOLING SYSTEMS

[75] Inventors: John P. Rawlings; James R. Partin, both of Stillwater, Okla.

[73] Assignee: Geo-Systems, Inc., Stillwater, Okla.

[21] Appl. No.: 558,025

[22] Filed: Dec. 5, 1983

[51] Int. Cl.[4] ............................................. F28D 15/00
[52] U.S. Cl. ...................................... 165/45; 165/142
[58] Field of Search ................................... 165/142, 45

[56] References Cited

U.S. PATENT DOCUMENTS 1,511,056  10/1924  Ercanbrack ........................ 165/142
4,328,858   5/1982  Richter ........................... 165/142 X Primary Examiner—Allen M. Ostrager
Attorney, Agent, or Firm—Head, Johnson & Stevenson

[57] ABSTRACT

An apparatus for achieving heat exchange between a liquid medium and the earth for insertion into a borehole in the earth, the apparatus having a casing, a cap closing the casing lower end, a dip tube of external diameter smaller than the interior diameter of the casing and positioned within the casing providing an annular area between the dip tube and the interior of the casing and a top manifold cap providing a first port connected to the upper end of casing and a second port connected to the upper end of the dip tube and flow channels within the manifold cap connecting the casing and dip tube to flow lines so that fluid may flow downward in the dip tube and upwardly within the annular area in the casing to exchange heat with the earth. A vent hole is provided to communicate with the upper end of the dip tube to prevent air lock.

2 Claims, 7 Drawing Figures

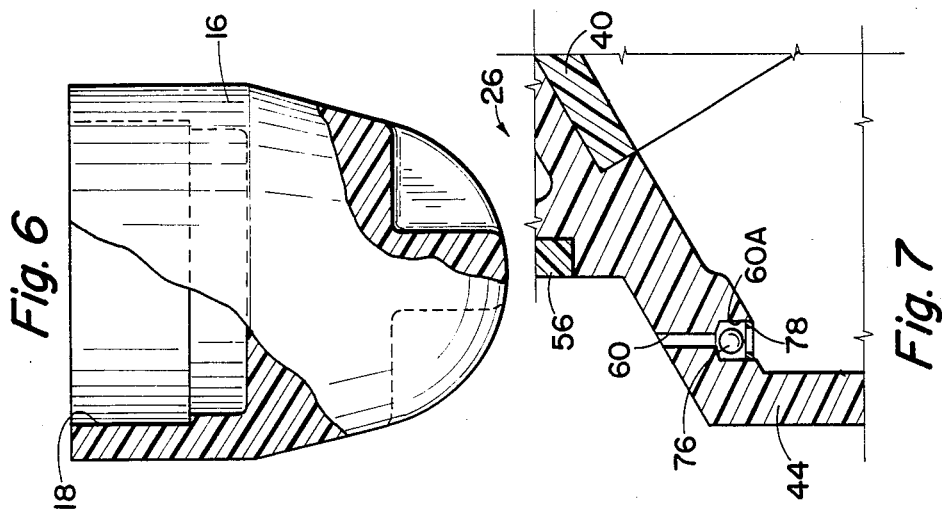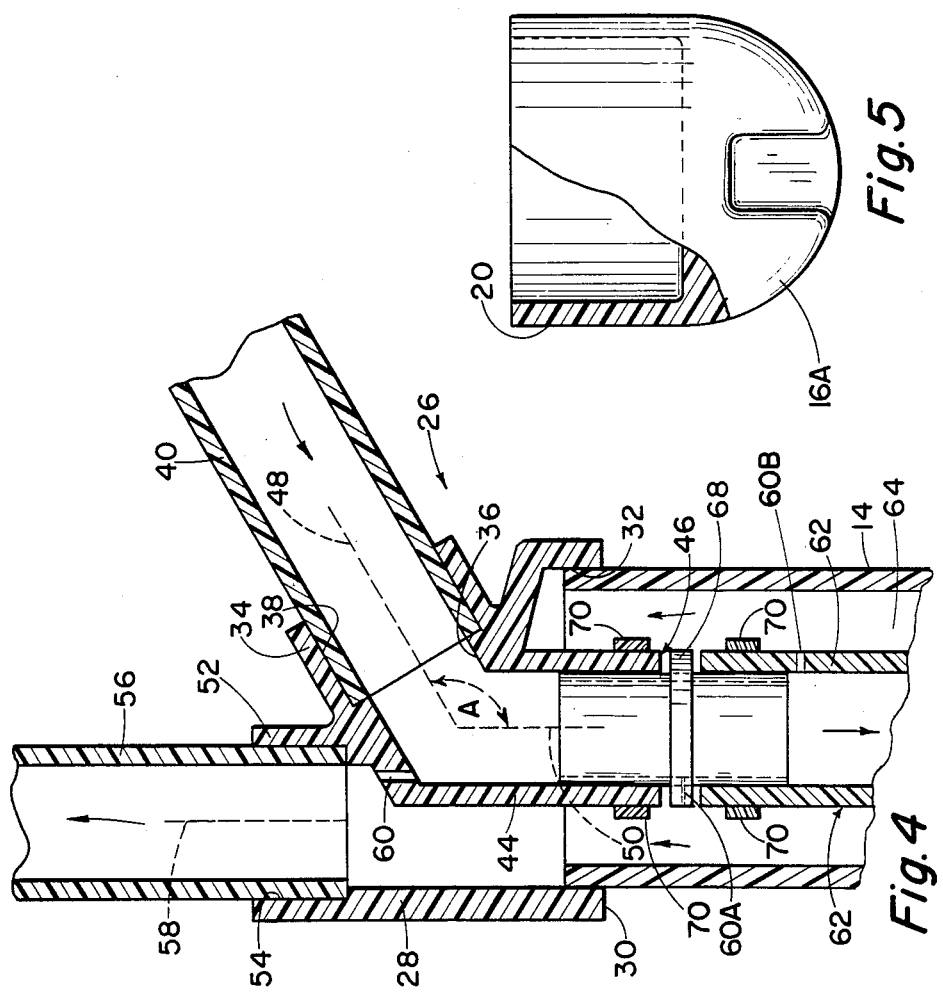

HEAT EXCHANGER FOR GEOTHERMAL HEATING AND COOLING SYSTEMS

SUMMARY OF THE INVENTION

In some systems for providing heat and or cooling to a building the exchange of heat with the earth itself is utilized. These types of systems contrast with another common system in which heat exchange is with the atmosphere. It has been demonstrated that more effective and efficient heat exchange can be accomplished between a medium and the earth than is accomplished by the heat exchange with the atmosphere. Further, such heat exchange can usually be achieved with less net energy loss.

Reference may be had to U.S. Pat. No. 4,257,239 entitled "Earth Coil Heating and Cooling System", issued Mar. 24, 1981. This patent gives a detailed explanation of a system for heating and cooling a building in which heat is exchanged with the earth. In the system described in this patent, fluid flow conduits are placed horizontally in a ditch formed in the earth, preferably in combination with a septic tank system. In some instances it is more desireable to provide heat exchange with the earth in which it is not feasible or practical to dig a ditch in the earths surface of sufficient depth and length to accomplish the required heat exchange. The present invention provides a means of achieving heat exchange with a vertical borehole in the earth. Such vertical boreholes can usually be drilled with less disruption of trees and shrubs in an area in which a building is to be constructed and, in some instances, at a more economical total cost.

Within the first 200 feet of the earths surface is a virtually untapped geothermal reservoir. This area is maintained at a relatively steady state by heat gain from the center of the earth and absorbed solar heat. As an example, in the Stillwater, Okla. area of the United States the approximate temperature in the first 200 feet of the earths surface is 62° F. which is substantially constant the year around. A heat pump can attract heat from or reject heat into this very moderate earth ambient temperature source more efficiently than with the atmosphere since the corresponding temperature of ambient air in this geographical area varies from a low of approximately 0° F. to a high of approximately 100° F.

In the past, the method of utilizing the earth ambient heat was by use of a liquid to air heat pump supplied by well water. Water from a well is circulated through the heat pump and then discarded or returned to the ground. However, this method is very vulnerable to water supply related problems. To solve this difficulty the closed loop method employing recirculated heat exchange liquid was developed such as is described in U.S. Pat. No. 4,257,239.

Various methods of closed loop heat exchange have been considered. Among these have been systems which employ coils, tanks or other liquid containers buried in the earth at depths ranging from wells of 200 feet to coils buried only a few feet below the surface of the earth. These systems suffer from some deficiencies but have been effective in tapping the virtually exhaustible heat source of the earth. These systems often include the ability to dispense liquid into the surrounding soil to enhance heat conductivity of the system to thereby improve the system performance, such as in conjunction with a septic system as described in U.S. Pat. No. 4,257,239. However, when a vertical well system is employed, water cannot be dispensed into the well bore. Health Department requirements generally demand that the well be plugged, with the expressed purpose of preventing surface water contamination of aquifers. Some systems stress the use of metallic materials to enhance heat transfer, however, these systems ignore the heat transfer characteristic of the earth and deterioration in such metallic materials. Further, all of the systems mentioned have inherent air locking problems.

In view of the above described state of the art, the object of the present invention is to provide a method and apparatus of achieving a high level of performance and cost effectiveness of a heat exchange system with the earth. This is accomplished by using an earth borehole which usually can be drilled in the earth at a cost of only a few dollars per vertical foot. The apparatus position in the borehole consists of a length of casing which is capped at the bottom and a dip tube of external diameter smaller than the internal diameter of the casing. The dip tube has an open end adjacent the capped bottom of the casing providing an annular space between the dip tube and the casing. A unique top manifold cap provides means of affording communications to flow lines so that fluid can be circulated into the top of the dip tube, down the dip tube and into the lower end of the casing where the fluid flows back up the annular area exchanging heat with the earth. At the top of the casing the top manifold provides communication to a second flow line connection.

An important aspect of the top manifold is means of preventing airlock in the system.

DESCRIPTION OF THE DRAWINGS

FIG. 4 is an enlarged view, partially in cross-section, of the upper end of the heat exchange apparatus of this invention, showing the top manifold primarily in cross-section and showing the means for preventing air lock in the system.

FIG. 5 is a view of a lower cap member shown partially in cross-section utilized to close off the lower end of the casing.

FIG. 6 is an alternate view of a lower cap as may be employed for closing the lower end of the casing.

FIG. 7 is a fragmentary cross-sectional view of a portion of the top manifold and showing an alternate arrangement of the weep hole.

DESCRIPTION OF THE PREFERRED EMBODIMENT

Figure 1:
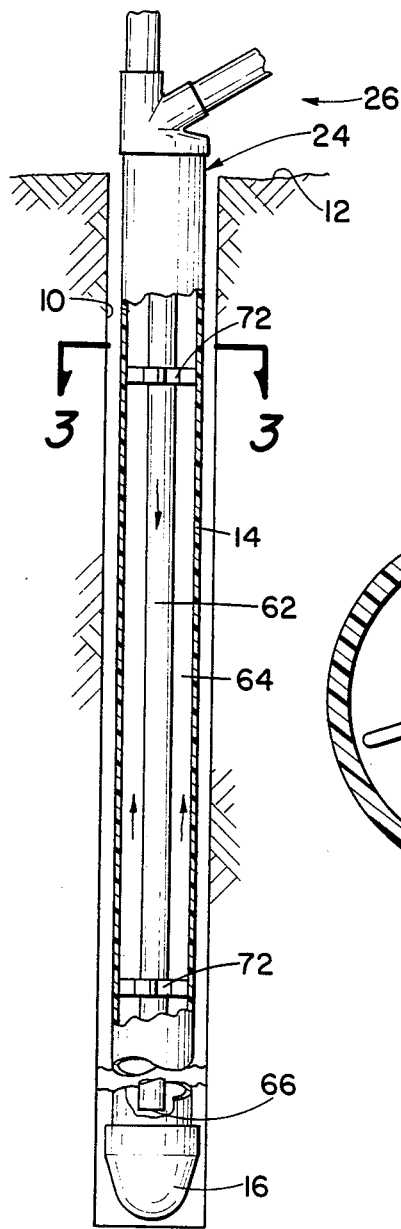
FIG. 1 is an elevational view, cut away and shown partially in cross-section, of an apparatus for practicing the invention, the apparatus being shown positioned within a borehole in the earth.
Figure 2:
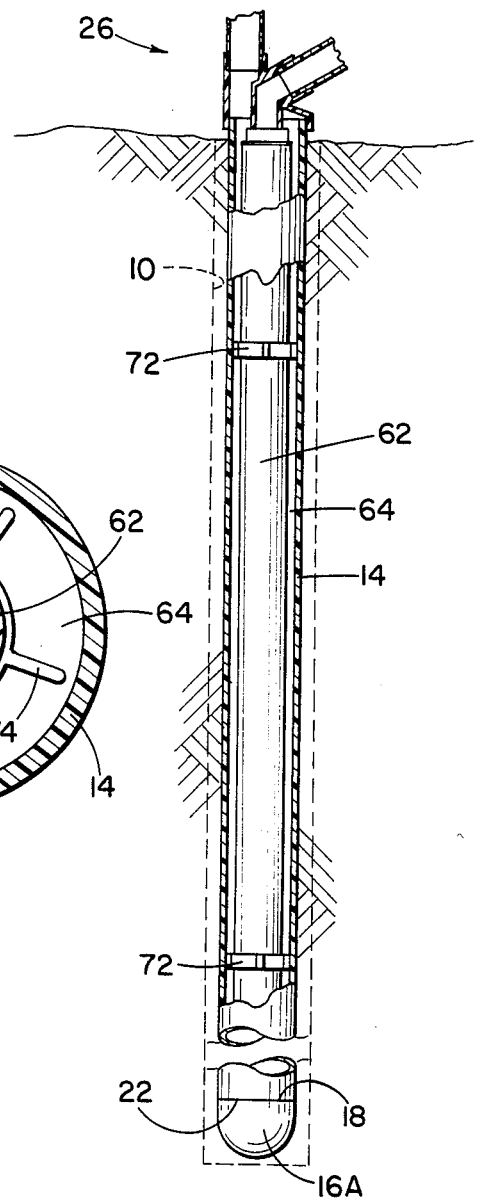
FIG. 2 is a view as in FIG. 1 but showing the top manifold in cross-sectional view, and showing the use of a larger diameter dip tube.

Referring first to FIGS. 1 and 2, an embodiment of the invention is illustrated. A borehole 10 is formed in the earth and extends from the bottom 12 of a trench formed in the earth. The bottom 12 of the trench is about four feet below the earth's surface or below the frost line so that the lines connected to the apparatus positioned in the borehole will be buried below the frost line. The borehole 10 extends down to a depth which will provide the required amount of heat transfer. This depth will be determined by several factors, including the total amount of heat to be transferred, the diameter of the casing to be employed, the characteristics of the soil in which the borehole is formed and so forth. In the typical application of this invention to provide a heat exchange system for a heat pump used to heat or air condition an average size house, the total depth of the boreholes 10 be approximately 400-feet. In most areas of the United States a borehole drilled in the earths surface will be partially filled with water inherently present in the earth. The quality of this earth water is of no relevance, that is whether it is potable or not, since it is not removed from the borehole. Regardless of the amount of water present, the borehole 10 must be backfilled its entire length.

Positioned in the borehole 10 is a casing 14 which may be of a diameter such as 2, 4, or 6 inches or the like. The lower end of casing 14 is closed with an end cap 16 which may be of the type illustrated in FIGS. 1 and 6 in which the end cap 16 has an opening 18 in the upper end to slideably receive the lower end of the casing. The casing 14 and end cap 16 are preferably formed of a plastic material so that the end cap 16 may be secured to the casing by the use of either a liquid bonding material, typically including a solvent or socket heat fusion. Another type of end cap identified by the numeral 16A may be the type as shown in FIGS. 2 and 5 in which the external diameter 20 of the end cap is substantially equal to the external diameter of the casing 14. The end cap is then fixed to the lower end 22 of the casing in an abutting relationship which may also be accomplished by bonding or by fusing. These techniques are well known to those experienced in joining together pipes of various kinds of plastic materials.

Referring again to FIGS. 1 and 2, affixed to the upper end 24 of casing 14 is a top manifold generally indicated by the numeral 26. The manifold 26 is best shown in the enlarged cross-sectional view of FIG. 4. The top manifold 26 includes a body 28 having an enlarged diameter tubular lower end 30 which is of internal diameter 32 adaptable to telescopically extend over the upper exterior end of casing 14. The manifold includes integral reduced diameter tubular upper end 34 which provides a tubular supply port 36. The tubular upper end 34 has an internal diameter 38 to receive the end of a supply conduit 40.

Integrally formed within the interior of the top manifold 26 and extending downwardly and coaxially within the enlarged diameter lower end 32 is a tubular portion 44. This tubular portion 44 has a opened lower end 46 adapted to communicate with a dip tube which will be described subsequently. The tubular portion 44 is preferably coaxial of the lower internal portion 32 of the manifold and in the preferred arrangement. As illustrated, the tubular upper end 34 extends at an angle and in the nature of a sidewall from the manifold. The preferred angle of the axis of the internal openings 36 and 38 with that of the axis of the tubular portion 44 is between 30 and 60° although it can be seen that the angle A could be between 90° and 150° with the dotted line 48 indicating the axis of openings 36 and 38 and the dotted line 50 indicating the axis of the tubular portion 44.

Extending integrally upwardly from the body 28 is a reduced diameter tubular upper end 52 having an internal diameter 54 providing means for connection to a heat transfer fluid medium outlet conduit 56. The axis of the tubular upper end 52, indicated by the dotted line 58, is parallel to the axis of the tubular portion 44 indicated by dotted line 50.

The tubular portion 44 has a small diameter air venting weep opening 60 therein which provides communication between the interior of the tubular portion 44 and the upper end tubular portion 52.

Returning once more to FIGS. 1 and 2, there is suspended within the casing 14 a dip tube 62 which is a conduit having an external diameter less than the internal diameter of the casing 14. In FIG. 1 the diameter of dip tube 62 is substantially less than that of the casing 14 whereas in FIG. 2 the diameter of the dip tube is greater but still smaller than the casing. In any event, the dip tube is of reduced diameter to be slideably received within the casing 14 and to provide an annular space 64 between the exterior of the dip tube and the interior of the casing. The lower end 66 of the dip tube terminates above the casing lower end, so that fluid can flow downwardly within the dip tube 62, emerge and flow upwardly in the annular area 64.

As shown in FIG. 4 the dip tube 62 may be connected to the lower end of the top manifold tubular portion 44 by means of an insert coupling 68. Bands 70 positioned around the upper end of dip tube 62 and the lower end of manifold tubular portion 44 serve to hold these components to- gether.

In the typical application, the heat exchange fluid is water and preferably water laden with a chemical to lower its freezing point to below that expected to be encountered in its use. The heat exchange fluid is passed from the supply conduit 40 in the direction indicated by the arrow and flows downwardly in the dip tube, emerging at the lower end of the dip tube into the interior of the casing. It then flows upwardly in the annular space 64 and emerges and passes into the the outlet conduit 56. The fluid moves upwardly within the annular space and transfers energy with the surrounding earth, either absorbing heat if it is cooler than the earth, or transmitting heat to the earth if it is hotter. The fluid flowing through the outlet conduit 56 will thereby approach that of the earth ambient temperature.

Figure 3:
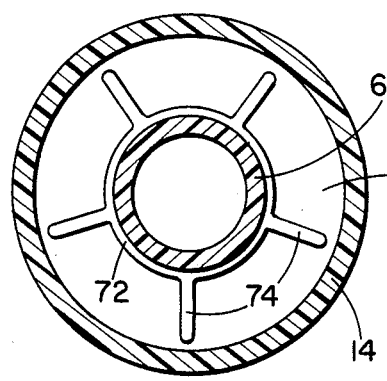
FIG. 3 is a cross-sectional view of a spacer as employed in the invention as shown along the line 3—3 of Figure 1.

In order to provide a uniform annular space 64 spacers 72 are positioned on the exterior of the dip tube 62 as spaced intervals. The spacers fit on the exterior of the dip tube 62 and have radially extending fins 74 so as as not to impede the flow of fluid in the annular space 64 but nevertheless they hold the dip tube substantially centered within the casing 14, as illustrated in the enlarged detail of FIG. 3. The fins 72 provide a means of promoting turbulent flow in the casing 14 and therefore additionally increase heat transfer.

The invention provides a unique means of achieving a heat transfer system between a fluid medium and the earth.

As previously mentioned, one of the problems with fluid circulation systems to obtain heat exchange with the earth is avoiding the occurrence of air traps. To solve this problem weep hole 60 (See FIG. 4) is provided. The weep hole 60 is of sufficient diameter to let air trapped within the upper end of the dip tube 62 pass into the interior of the compartment communicating with the upper end of the casing 14. While the weep hole 60 is of small diameter so as not to permit sufficient bypass of fluid to materially affect heat transfer with the earth nevertheless it is large enough to afford an escape path for trapped air so that the system is preserved in maximum operating effectiveness.

An alternate location for the weep hole is in the insert coupling 68, the alternate weep hole being indicated by 60A or the weep hole may be in the top of the dip tube 62.

FIG. 7 shows an alternate arrangement for the weep hole 60. A larger diameter portion 60A receives a floating ball 76. A ring 78 inserted in the bottom of recess 60A keeps the ball in position. When air is in the dip tube the ball falls downwardly allowing the air to escape through opening 60, but if fluid is in the dip tube, ball 76 floats, closing hole 60 to prevent the short circuiting of fluid.

The system of this invention can be employed with a single borehole arrangement as shown in FIGS. 1 and 2, however, if greater heat exchange capacity is required, and if shallow or deep holes are more feasible, multiple boreholes may be employed with the apparatus in each hole connected in parallel, or manifold arrangement. When a manifold heat exchange system is used, the provisions of the present invention which prevent air blocking of the system became of increasing importance. Where no system exists the prevent air lock, one or more systems connected in a manifold can become ineffective due to such air lock. By employing the principles of this invention vertical holes in the earth connected in a manifold system can be more effectively utilized. Such manifold systems may be used to serve one or more heat pump systems.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. Apparatus for achieving heat exchange between a liquid medium and the earth in a vertical borehole in the earth, comprising:

a casing adapted to be positioned in a vertical borehole in the earth, the exterior surface of the casing being in thermal contact with the earth;

a cap closing the casing lower end;

a dip tube of external diameter smaller than the interior diameter of said casing, the dip tube being positioned within said casing providing an annular area between the interior of said casing and the exterior of the dip tube, the bottom end of the dip tube being open and spaced above said cap;

a top manifold providing a first part connected to the upper end of said casing, a second part connected to the upper end of said dip tube, the second part having a vertical vent hole therein, a third part providing means to connect an outlet conduit, and a fourth part providing means to connect a supply conduit, the first and third parts and the second and fourth parts respectively communicating with each other within the manifold whereby fluid may be passed from a supply conduit into said dip tube to flow downwardly to emerge within said casing adjacent the bottom thereof, and flow upwardly in said annular area within said casing into said top manifold and out said third part to an outlet conduit or in the opposite direction, the fluid exchanging heat with the earth as it flows in said casing, said manifold providing connection to the casing, dip tube, outlet conduit and supply conduit in a common vertical plane; and means to close said hole to prevent the passage of fluid therethrough.

2. Apparatus according to claim 1 wherein said means of closing said hole to prevent the passage of fluid therethrough includes a closure member of specific gravity less than that of the liquid medium, the closure member floating upwardly to close said hole in the presence of liquid medium in the upper portion of said dip tube.

* * * * *